(12) United States Patent
Straub

(10) Patent No.: US 9,091,199 B2
(45) Date of Patent: Jul. 28, 2015

(54) COMBUSTION SYSTEM FOR AN ENGINE HAVING A SWIRL INDUCING COMBUSTION CHAMBER

(71) Applicant: GM GLOBAL TECHNOLOGY OPERATIONS LLC, Detroit, MI (US)

(72) Inventor: Robert D. Straub, Lowell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 13/776,768

(22) Filed: Feb. 26, 2013

(65) Prior Publication Data

US 2014/0238341 A1    Aug. 28, 2014

(51) Int. Cl.

| F02B 31/00 | (2006.01) |
|---|---|
| F02B 3/00 | (2006.01) |
| F02F 3/24 | (2006.01) |
| F02B 23/00 | (2006.01) |
| F02B 17/00 | (2006.01) |
| F02B 23/06 | (2006.01) |

(52) U.S. Cl.
CPC ........... *F02B 17/005* (2013.01); *F02B 23/0624* (2013.01); *F02B 23/0669* (2013.01); *F02B 23/0678* (2013.01); *Y02T 10/125* (2013.01)

(58) Field of Classification Search
CPC ........... F02B 2275/48; F02B 2023/106; F02B 2023/107; F02B 2023/108; F02F 3/28
USPC .................. 123/298, 301, 306, 307, 659, 661
See application file for complete search history.

(56) References Cited

U.S. PATENT DOCUMENTS

| 1,745,884 | A | * | 2/1930 | Barnaby | 123/307 |
|---|---|---|---|---|---|
| 2,709,992 | A | * | 6/1955 | Graves | 123/276 |
| 2,766,738 | A | * | 10/1956 | Hoffmann | 123/269 |
| 4,357,915 | A | * | 11/1982 | Monsour | 123/45 R |
| 4,467,752 | A | * | 8/1984 | Yunick | 123/193.6 |
| 4,733,642 | A | * | 3/1988 | Ishida | 123/276 |
| 5,103,784 | A | * | 4/1992 | Evans | 123/279 |
| 5,979,399 | A | * | 11/1999 | Piock et al. | 123/301 |
| 6,062,192 | A | * | 5/2000 | Wirth et al. | 123/295 |

* cited by examiner

*Primary Examiner* — Lindsay Low
*Assistant Examiner* — Garrett M Hausman
(74) *Attorney, Agent, or Firm* — Quinn Law Group, PLLC

(57) ABSTRACT

A combustion chamber of an internal combustion engine includes a contoured surface that defines a plurality of deflection foils. The contoured surface distributes fuel spray into portions directed toward one of the deflection foils. Each deflection foil re-directs their respective portion of the fuel spray into a combined radial path that swirls about a center of the combustion chamber. Each of the deflection foils defines a flow path and a foil axis. The flow path includes an entrance segment and an exit segment. The entrance segment directs a portion of the fuel spray radially away from the center of the combustion chamber, and the exit segment directs the portion of the fuel spray substantially tangential relative to the combined radial path of the re-directed portions of the fuel spray.

17 Claims, 3 Drawing Sheets

COMBUSTION SYSTEM FOR AN ENGINE HAVING A SWIRL INDUCING COMBUSTION CHAMBER

TECHNICAL FIELD

The invention generally relates to a combustion chamber for an internal combustion engine.

BACKGROUND

Modern engine assemblies, including but not limited to diesel engines, may include a direct injection fuel system having a fuel injector that directly injects a stream of fuel, i.e., a fuel spray, into a combustion chamber of the engine assembly. The fuel spray mixes with air within the combustion chamber prior to combustion. The degree of mixture achieved between the fuel spray and the air within the combustion chamber affects the fuel economy and the hydrocarbon emissions of the internal combustion engine.

SUMMARY

An internal combustion engine is provided. The internal combustion engine includes an engine assembly defining a bore that extends along a central bore axis. A piston is disposed within the bore. The piston is moveable in a reciprocating motion within the bore along the central bore axis. The piston and the engine assembly cooperate to define a combustion chamber. The internal combustion engine further includes a direct injection fuel system having a fuel injector for injecting a fuel spray into the combustion chamber. The fuel spray is injected into the combustion chamber along a path. The combustion chamber includes a contoured surface that defines a plurality of deflection foils. The contoured surface receives and re-distributes the path of the fuel spray into a plurality of portions, with each portion of the fuel spray directed toward one of the plurality of deflection foils. Each of the plurality of deflection foils re-directs their respective portion of the fuel spray into a combined radial path that swirls about a center of the combustion chamber.

A combustion chamber of an internal combustion engine is also provided. The combustion chamber includes a contoured surface that defines a plurality of deflection foils. The contoured surface is shaped for receiving and distributing an injected fuel spray into a plurality of portions. Each portion of the fuel spray is directed toward one of the plurality of deflection foils. Each of the plurality of deflection foils re-directs their respective portion of the fuel spray into a combined radial path that swirls about a center of the combustion chamber. Each of the plurality of deflection foils include a foil axis that extends radially outward from the center of the combustion chamber through a center of each deflection foil, and a flow path. The flow path includes an entrance segment, an exit segment, and a transition segment. The entrance segment forms an entrance angle with the respective foil axis of the deflection foil. The exit segment forms an exit angle with the respective foil axis of the deflection foil. The transition segment transitions between the entrance segment and the exit segment. The entrance angle is between 7° and 20°, and the exit angle is between 30° and 60°. The exit angle is larger than the entrance angle. The entrance segment of the flow path of each deflection foil directs a respective portion of the fuel spray radially away from the center of the combustion chamber, and the exit segment of the flow path of each deflection foil directs the respective portion of the fuel spray substantially tangential relative to the combined radial path of the re-directed portions of the fuel spray.

Accordingly, the deflection foils are angularly spaced about the central bore axis, with each of the deflection foils re-directing a portion of the fuel spray into the combined radial path of the re-directed portions of the fuel spray. The separation of the fuel spray into portions, and the following re-direction of each portion and recombining of the individual portions into a single, combined radial path that swirls around the center of the combustion chamber, increases the mixing between the fuel spray and the air within the combustion chamber, thereby improving fuel efficiency, as well as hydrocarbon, soot and carbon monoxide emissions.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
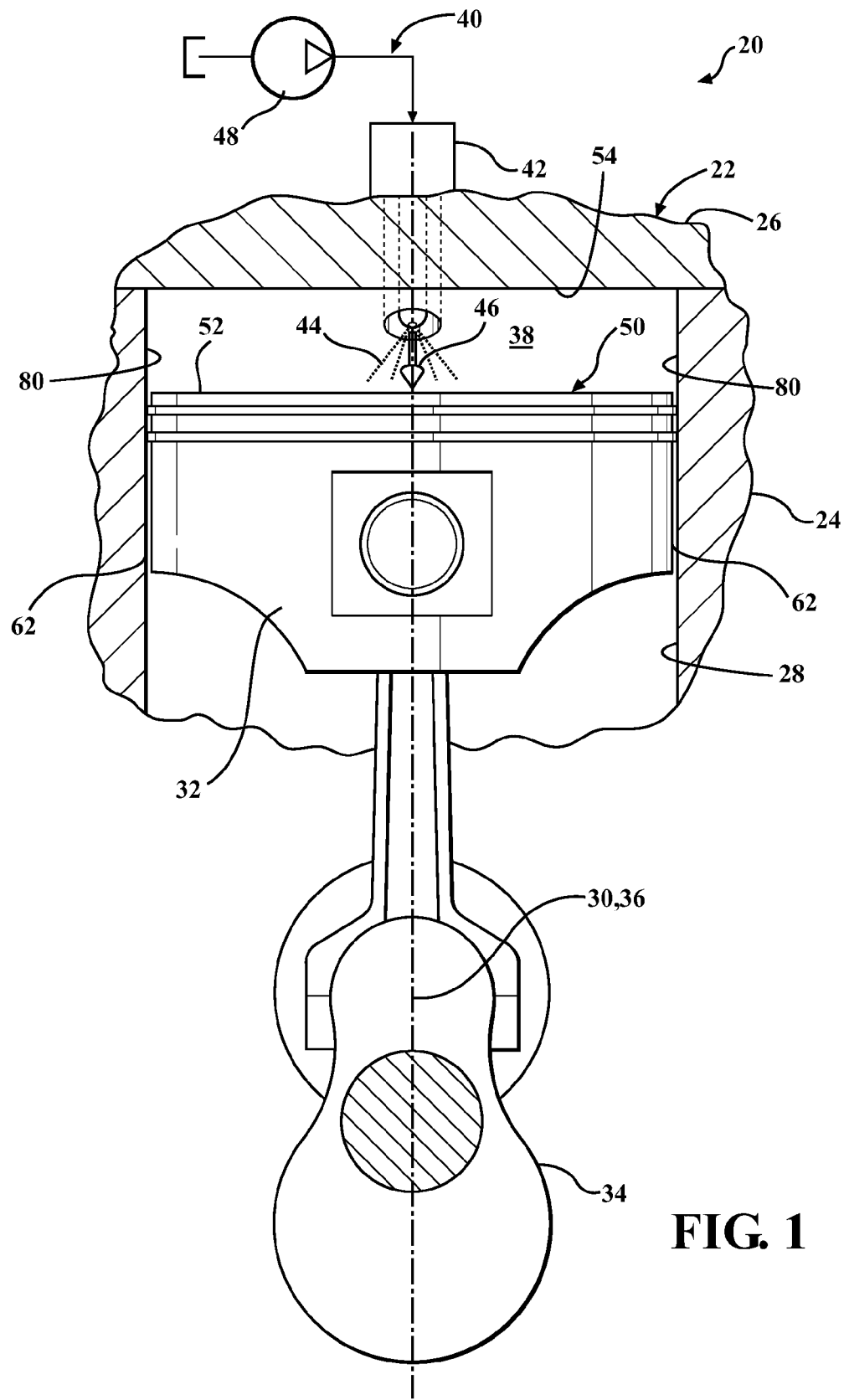
FIG. 1 is a cross sectional view of an engine assembly.

Referring to the Figures, wherein like numerals indicate like parts throughout the several views, an internal combustion engine is generally shown at 20 in FIG. 1. The internal combustion engine 20 may include but is not limited to a gasoline engine or a diesel engine.

Referring to FIG. 1, the internal combustion engine 20 includes an engine assembly 22. The engine assembly 22 includes but is not limited to an engine block 24 and a cylinder head 26. The engine block 24 defines a bore 28 that extends along a central bore axis 30. The cylinder head 26 is attached to the engine block 24 above and adjacent the bore 28. A piston 32 is disposed within the bore 28, and is reciprocally moveable within the bore 28 along the central bore axis 30 to drive rotation of a crankshaft 34. The piston 32 includes a radial center 36 that is aligned and coaxial with the central bore axis 30. The piston 32 and the engine assembly 22, and particularly the piston 32, the engine block 24 and the cylinder head 26, cooperate to define a combustion chamber 38 therebetween.

The internal combustion engine 20 further includes a direct injection fuel system 40. The direct injection fuel system 40 includes a fuel injector 42 in fluid communication with the combustion chamber 38. The fuel injector 42 injects a stream of fuel, i.e., fuel spray 44, into the combustion chamber 38. The fuel spray 44 is injected into the combustion chamber 38 along a linear path 46. While it should be appreciated that the injected fuel spray 44 may fan out over a distance to define a plume of injected fuel spray 44, a centerline of the plume extends along the straight, non-curving, linear path 46. Once injected into the combustion chamber 38, the fuel spray 44 may mix with combustion air to form a fuel/air mixture. The direct injection fuel system 40 further includes a fuel pump 48. The fuel pump 48 provides the fuel injector 42 with pressurized fuel. For example, the fuel pump 48 may provide the fuel to the fuel injector 42 at a pressure of at least 120 MPa, and more preferably greater than 200 MPA.

As shown in FIGS. 1 through 4, the fuel injector 42 is positioned relative to the bore 28 and the piston 32 to inject the fuel spray 44 into the combustion chamber 38 such that the linear path 46 is approximately parallel with the central bore axis 30. The fuel injector 42 is positioned so that the centerline of the fuel spray 44 is positioned approximately co-axial with the central bore axis 30, at a center of the combustion chamber 38. As such, the centerline of the linear path 46 of the fuel spray 44 is centered at the radial center 36 of the piston 32.

The combustion chamber 38 includes a contoured surface 50. Preferably and as shown, the contoured surface 50 is defined by an axial end surface 52 of the piston 32, facing the cylinder head 26. However, it should be appreciated that the contoured surface 50 may be defined, for example, by a lower vertical surface 54 of the cylinder head 26, disposed directly above the bore 28 and facing the axial end surface 52 of the piston 32.

Figure 2:
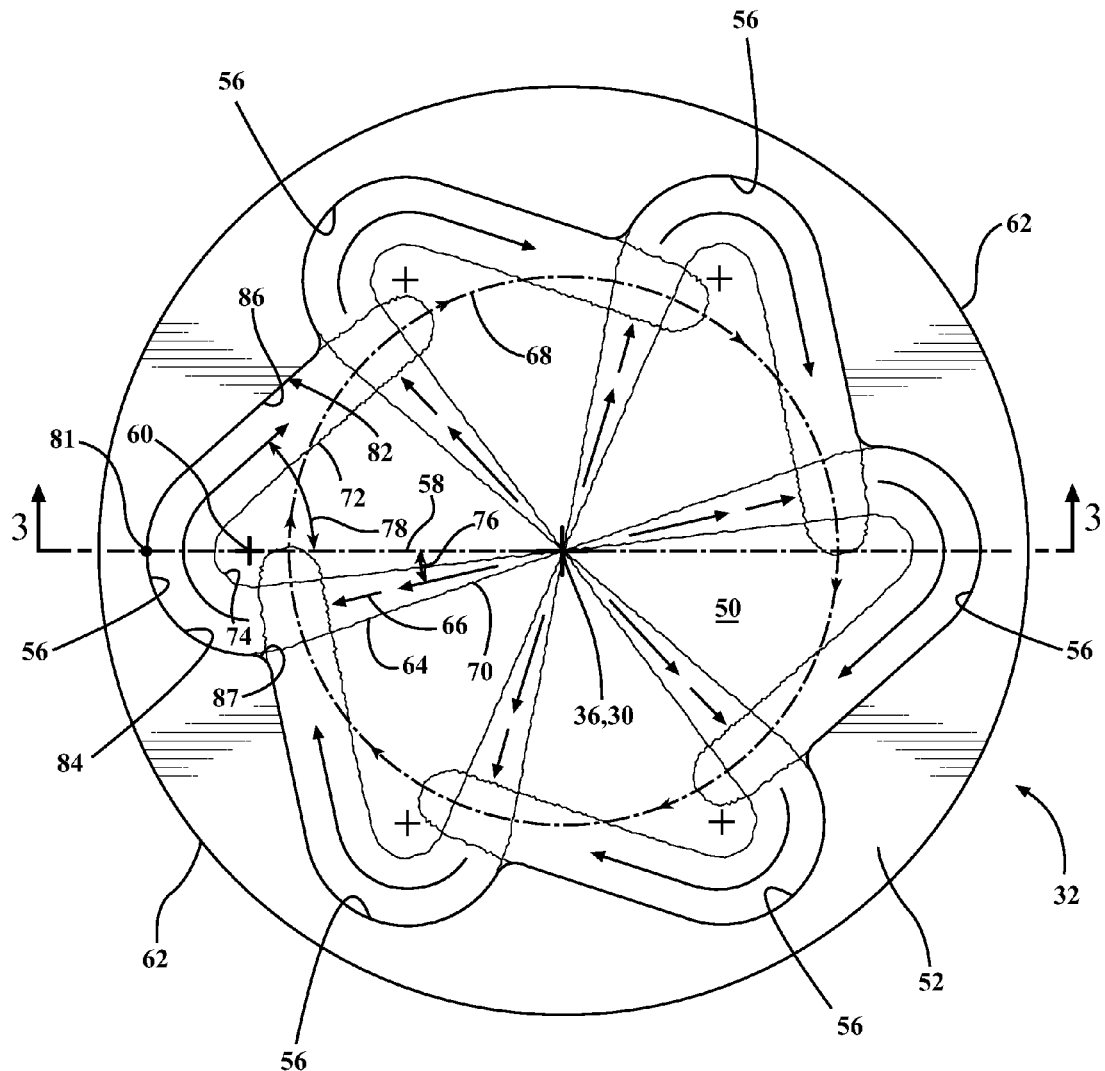
FIG. 2 is a plan view of a piston of the engine assembly showing a first embodiment of a contoured surface perpendicular to a central bore axis.
Figure 4:
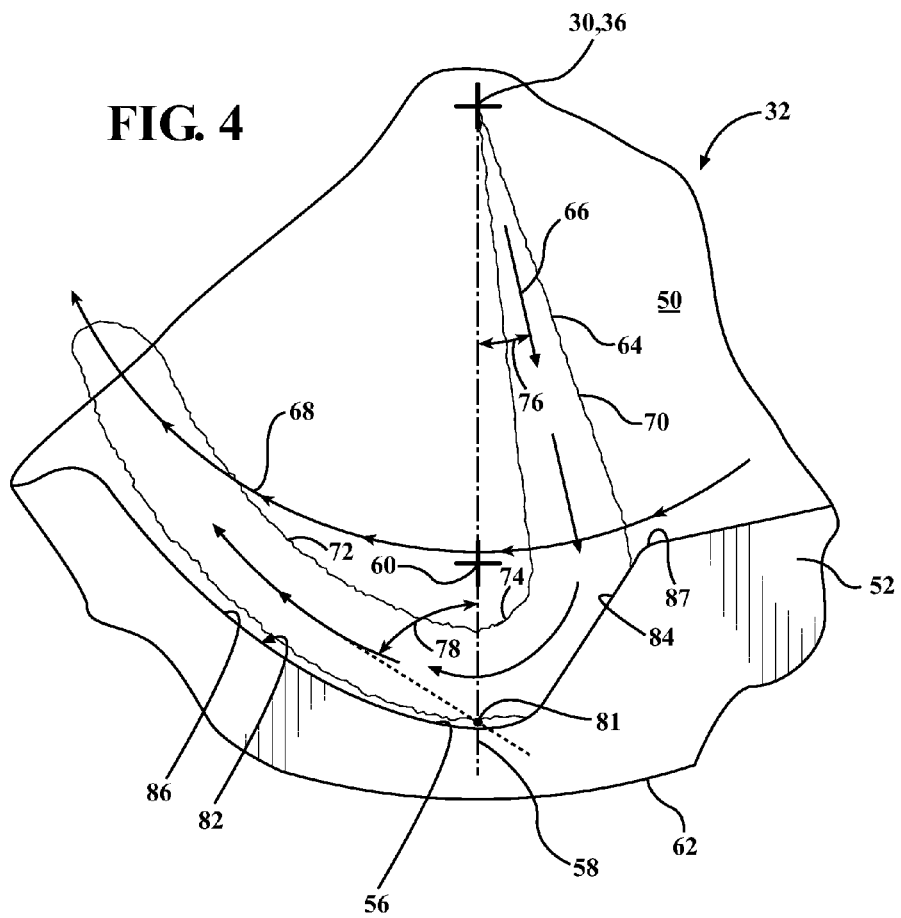
FIG. 4 is a fragmentary schematic plan view of the piston showing a second embodiment of the contoured surface perpendicular to the central bore axis.

Referring to FIG. 2, the contoured surface 50 defines a plurality of deflection foils 56. As shown in FIGS. 2 and 4, the contoured surface 50 defines six deflection foils 56. However, it should be appreciated that the number of deflection foils 56 may be greater than or less than the six deflection foils 56 shown in the exemplary embodiment. Each deflection foil 56 includes a foil axis 58 that extends from the center of the combustion chamber 38, i.e., the central bore axis 30, outward through a center 60 of the deflection foil 56 and toward a radial edge 62 of the piston 32. The deflection foils 56, and their respective foil axis 58, are angularly spaced about the central bore axis 30 an equal angle from each other. Accordingly, the deflection foils 56 and their respective foil axis 58 are angularly spaced equidistant from each other about the central bore axis 30 and the center of the combustion chamber 38.

Figure 3:
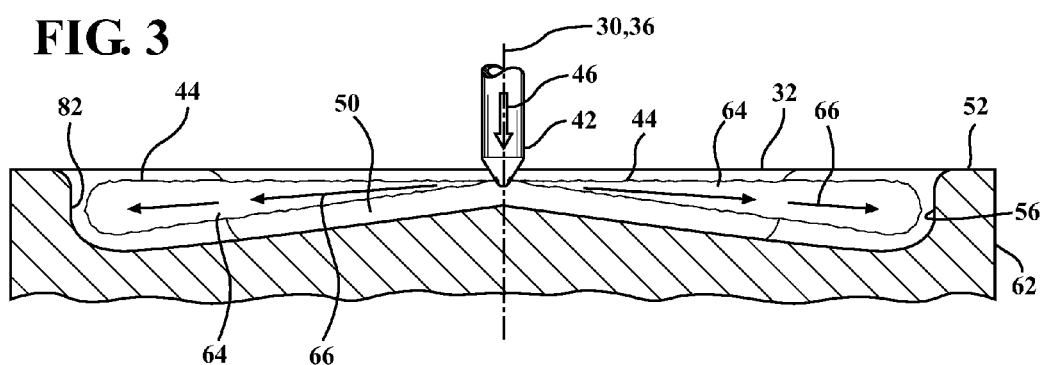
FIG. 3 is a cross sectional view (taken along line 3-3 in FIG. 2) of the piston parallel to the central bore axis, showing the first embodiment of the contoured surface.

Referring to FIGS. 2 and 3, the contoured surface 50 of the combustion chamber 38 is shaped and/or formed to distribute the fuel spray 44 from the fuel injector 42 into a plurality of approximately equal portions, generally indicated by reference numeral 64. Each portion 64 of the fuel spray 44 is directed toward one of the deflection foils 56. Each of the deflection foils 56 defines a flow path 66 to receive and re-direct the portion 64 of the fuel spray 44 directed thereto. The flow path 66 of each of the deflection foils 56 re-directs their respective portion 64 of the fuel spray 44 into a combined radial path 68 that swirls about a center of the combustion chamber 38, i.e., about the central bore axis 30. Accordingly, the combined radial path 68 of the re-directed portions 64 of the fuel spray 44 is approximately concentric with the radial center 36 of the piston 32.

Each of the deflection foils 56 re-directs their respective portion 64 of the fuel spray 44 in a common rotational direction about the central bore axis 30. As shown, each of the deflection foils 56 re-directs their respective portion 64 of the fuel spray 44 in a clockwise direction of rotation relative to the central bore axis 30, so that the combined radial path 68 circulates in the clockwise direction about the central bore axis 30. It should be appreciated that the deflection foils 56 may be reversed so that all of the deflection foils 56 re-directs their respective portion 64 of the fuel spray 44 in a counter-clockwise direction of rotation relative to the central bore axis 30, so that the combined radial path 68 circulates in the counter-clockwise direction about the central bore axis 30.

Accordingly, Referring to FIG. 3, as the fuel spray 44 is injected into the combustion chamber 38, the fuel spray 44 moves along the linear path 46, orthogonally toward the piston 32, until the fuel spray 44 contacts the contoured surface 50. Referring to FIG. 2, once the fuel spray 44 initially contacts the contoured surface 50, the contoured surface 50 directs the stream of the fuel spray 44 into the portions 64, which are directed radially outward relative to the central bore axis 30, toward one of the deflection foils 56. Each of the deflection foils 56 further re-directs the flow of the fuel spray 44 received therein into the combined radial path 68, which swirls or circles about the central bore axis 30. The splitting of the injected fuel spray 44 into the portions 64, the re-direction of the portions 64, and the re-joining of the individual portions 64 of the fuel spray 44 into the combined radial path 68, increases fuel/air mixing to provide a more uniformly and thoroughly mixed fuel/air mixture.

Referring to FIG. 2, the flow path 66 of each portion 64 of the fuel spray 44 includes an entrance segment 70, an exit segment 72, and a transition segment 74. The entrance segment 70 of each portion 64 of the fuel spray 44 is directed from the linear path 46 of injection, radially outward toward the radial edge 62 of the piston 32 and away from the radial center 36 of the piston 32. The exit segment 72 of each portion 64 of the fuel spray 44 is directed inward into the combustion chamber 38, along a substantially tangential path relative to the combined radial path 68 of the re-directed portions 64 of the fuel spray 44. The transition segment 74 transitions the direction of flow of the portion 64 of the fuel spray 44 between the entrance segment 70 and the exit segment 72.

Referring to FIG. 2, the entrance segment 70 of the flow path 66 and the foil axis 58 of each deflection foil 56 form an entrance angle 76 therebetween, having a vertex approximately located at the radial center 36 of the piston 32. The exit segment 72 of the flow path 66 and the foil axis 58 of each deflection foil 56 form an exit angle 78 therebetween, having a vertex 81 approximately located at an outer radial edge 80 of the combustion chamber 38. Accordingly, the entrance angle 76 and the exit angle 78 open in opposing directions. The exit angle 78 is larger than the entrance angle 76. Preferably, the entrance angle 76 is between the range of 7° and 20°, and the exit angle 78 is between the range of 30° and 60°. The sum of the entrance angle 76 and the exit angle 78 is less than ninety degrees)(90°).

Referring to FIG. 3, each deflection foil 56 includes an edge wall 82. The edge wall 82 of each deflection foil 56 extends generally parallel with the central bore axis 30. Referring to FIGS. 2 and 4, the edge wall 82 includes a first wall portion 84, a second wall portion 86, and an entrance portion 87. The first wall portion 84 re-directs the portion 64 of fuel spray 44 from the entrance segment 70 of the flow path 66 to the exit segment 72 of the flow path 66. The second wall portion 86 re-directs the portion 64 of the fuel spray 44 along the exit segment 72 of the flow path 66 toward and into the combined radial path 68 of the re-directed portions 64 of the fuel spray 44.

The first wall portion 84 of the edge wall 82 may include a curved cross section perpendicular to the central bore axis 30, or a linear cross section perpendicular to the central bore axis 30. The second wall portion 86 of the edge wall 82 may include a curved cross section perpendicular to the central bore axis 30, or a linear cross section perpendicular to the central bore axis 30. FIG. 2 shows the edge wall 82 of each deflection foil 56 having a curved first wall portion 84, and a linear second wall portion 86. FIG. 4 shows the edge wall 82 of each deflection foil 56 having a linear first wall portion 84, and a curved second wall portion 86. It should be appreciated that the edge wall 82 may be configured in a different manner than shown and described herein that is capable of directing the portion 64 of the fuel spray 44 from the entrance segment 70 to the exit segment 72 of the flow path 66, and toward the combined radial path 68.

The entrance angle 76 may be chosen such that the entrance segment 70 of each portion 64 of the fuel spray 44 enters the first wall portion 84 of the deflection foil 56 with the entire spray located between the center 60 of the deflection foil 56 and the entrance portion 87 of the edge wall 82. The entrance angle 76 may be adjusted experimentally or analytically relative to the width of the fuel spray 44 entering the deflection foil 56 and any preexisting level of swirl or air motion that may exist in the combustion chamber 38. In the preferred embodiment, the entrance segment 70 of each portion 64 of the fuel spray 44 is biased toward the entrance portion 87 of the edge wall 82 of the deflection foil 56.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An internal combustion engine comprising:
an engine assembly defining a bore extending along a central bore axis;
a piston disposed within the bore and moveable in a reciprocating motion within the bore along the central bore axis;
wherein the piston and the engine assembly cooperate to define a combustion chamber;
a direct injection fuel system having a fuel injector for injecting a fuel spray into the combustion chamber along a path;
wherein the combustion chamber includes a contoured surface defining a plurality of deflection foils;
wherein the contoured surface receives and re-distributes the fuel spray into a plurality of portions, with each portion of the fuel spray directed toward a respective one of the plurality of deflection foils, and with each of the plurality of deflection foils re-directing their respective portion of the fuel spray into a combined radial path swirling about a center of the combustion chamber,
wherein each of the deflection foils defines a flow path for its respective one portion of the fuel spray, and a foil axis extending radially outward from the center of the combustion chamber through a center of each deflection foil;
wherein the flow path of each deflection foil includes an entrance segment forming an entrance angle with the respective foil axis of the deflection foil, and an exit segment forming an exit angle with the respective foil axis of the deflection foil; and
wherein the entrance segment of the flow path of each deflection foil is directed radially away from the center of the combustion chamber and toward a radial edge of the piston, and wherein the exit segment of the flow path of each deflection foil is directed radially inward relative to the center of the combustion chamber and away from the radial edge of the piston, and tangential relative to the combined radial path of the re-directed portions of the fuel spray.

2. The internal combustion engine as set forth in claim 1 wherein the contoured surface is defined by an axial end surface of the piston.

3. The internal combustion engine as set forth in claim 1 wherein the path of the fuel spray is parallel with the central bore axis.

4. The internal combustion engine as set forth in claim 3 wherein the path of the fuel spray includes a centerline centered at the center of the combustion chamber.

5. The internal combustion engine as set forth in claim 4 wherein the combined radial path of the re-directed portions of the fuel spray is concentric with a radial center of the piston.

6. The internal combustion engine as set forth in claim 1 wherein the exit angle is larger than the entrance angle.

7. The internal combustion engine as set forth in claim 1 wherein the entrance angle is between 7° and 20°, and wherein the exit angle is between 30° and 60°.

8. The internal combustion engine as set forth in claim 1 wherein the sum of the entrance angle and the exit angle is less than ninety degrees (90°).

9. The internal combustion engine as set forth in claim 1 wherein the flow path of each deflection foil includes a transition segment transitioning between the entrance segment and the exit segment.

10. The internal combustion engine as set forth in claim 1 wherein each of the deflection foils includes an edge wall extending parallel with the central bore axis, with the edge wall including a first wall portion re-directing the portion of fuel spray from the entrance segment of the flow path to the exit segment of the flow path, and a second wall portion for re-directing the portion of the fuel spray along the exit segment of the flow path toward and into the combined radial path of the re-directed portions of the fuel spray.

11. The internal combustion engine as set forth in claim 10 wherein the first wall portion of the edge wall includes a curved cross section perpendicular to the central bore axis.

12. The internal combustion engine as set forth in claim 10 wherein the first wall portion of the edge wall includes a linear cross section perpendicular to the central bore axis.

13. The internal combustion engine as set forth in claim 10 wherein the second wall portion of the edge wall includes a curved cross section perpendicular to the central bore axis.

14. The internal combustion engine as set forth in claim 10 wherein the second wall portion of the edge wall includes a linear cross section perpendicular to the central bore axis.

15. The internal combustion engine as set forth in claim 1 wherein each of the plurality of deflection foils re-directs their respective portion of the fuel spray in a common rotational direction about the central bore axis.

16. A combustion chamber of an internal combustion engine, the combustion chamber comprising:
a contoured surface defining a plurality of deflection foils, and shaped for distributing an injected fuel spray into a plurality of portions, with each portion of the fuel spray directed toward a respective one of the plurality of deflection foils, and with each of the plurality of deflection foils re-directing their respective portion of the fuel spray into a combined radial path swirling about a center of the combustion chamber, wherein each of the plurality of deflection foils includes:

a foil axis extending radially outward from the center of the combustion chamber through a center of each deflection foil; and a flow path including an entrance segment forming an entrance angle with the respective foil axis of the deflection foil, an exit segment forming an exit angle with the respective foil axis of the deflection foil, and a transition segment transitioning between the entrance segment and the exit segment;

wherein the entrance angle is between 7° and 20°, and the exit angle is between 30° and 60°;

wherein the exit angle is larger than the entrance angle; and wherein the entrance segment of the flow path of each deflection foil directs the respective portion of the fuel spray radially away from the center of the combustion chamber and toward a radial edge of the piston, and the exit segment of the flow path of each deflection foil directs the respective portion of the fuel spray radially inward relative to the center of the combustion chamber and away from the radial edge of the piston and tangential relative to the combined radial path of the re-directed portions of the fuel spray.

17. The internal combustion engine set forth in claim 1 wherein the exit segment is located radially farther from a radial center of the piston than the combined radial path.

* * * * *